(12) United States Patent
Lee et al.

(10) Patent No.: US 12,026,982 B2
(45) Date of Patent: Jul. 2, 2024

(54) HANDWRITING RECOGNITION WITH LANGUAGE MODELING

(71) Applicant: Ancestry.com Operations Inc., Lehi, UT (US)

(72) Inventors: Jinsol Lee, Lehi, UT (US); Gopalkrishna Balkrishna Veni, Lehi, UT (US); Masaki Stanley Fujimoto, Provo, UT (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 379 days.

(21) Appl. No.: 17/452,658

(22) Filed: Oct. 28, 2021

(65) Prior Publication Data

US 2022/0138453 A1   May 5, 2022

Related U.S. Application Data

(60) Provisional application No. 63/107,511, filed on Oct. 30, 2020.

(51) Int. Cl.
| | | |
|---|---|---|
| *G06F 18/214* | (2023.01) | |
| *G06N 3/04* | (2023.01) | |
| *G06V 10/75* | (2022.01) | |
| *G06V 40/30* | (2022.01) | |

(52) U.S. Cl.
CPC ............ *G06V 40/30* (2022.01); *G06F 18/214* (2023.01); *G06N 3/04* (2013.01); *G06V 10/751* (2022.01)

(58) Field of Classification Search
None
See application file for complete search history.

(56) References Cited

U.S. PATENT DOCUMENTS

2023/0010202 A1\*  1/2023  Fujimoto ............... G06N 3/084

OTHER PUBLICATIONS

Alluin, Maxence, "Embedding for spelling correction," *Towards Data Science*, Sep. 24, 2019, 9 pages.
"Chars2vec: character-based language model for handling real world texts with spelling errors and . . . " *@intuition.engin*, Feb. 25, 2019, 20 pages.
Dixon, Matthew, "A phonetic matching made in 'hɛvə n," *Microsoft Research Blog*, Jun. 6, 2019, 11 pages.
Scheidl, Harald, "Build a Handwritten Text Recognition System using TensorFlow," *Towards Data Science*, Jun. 15, 2018, 15 pages.

(Continued)

*Primary Examiner* — Dov Popovici
(74) *Attorney, Agent, or Firm* — Keller Preece PLLC

(57) ABSTRACT

Systems and methods for handwriting recognition using language modeling facilitate improved results by using a trained language model to improve results from a handwriting recognition machine learning model. The language model may be a character-based language model trained on a dataset pertinent to field values on which the handwriting recognition model is to be used. A loss prediction module may be trained with the handwriting recognition model and/or the language model and used to determine whether a prediction from the handwriting recognition model should be refined by passing the prediction through the trained language model.

20 Claims, 7 Drawing Sheets

(56) References Cited

OTHER PUBLICATIONS

Scheidl, Harald, "Word Beam Search: A CTC Decoding Algorithm," *Towards Data Science,* Jul. 19, 2018, 11 pages.
Aggarwal Milan et al: "Multi-Modal Association based Grouping for Form Structure Extraction," 2020 IEEE Winter Conference on Applications of Computer Vision (WACV), IEEE, Mar. 1, 2020, pp. 2064-2073, XP033771028, DOI: 10.1109/WACV45572.2020.9093376 Sections 1 and 4.
Eltay Mohamed et al: "Exploring Deep Learning Approaches to Recognize Handwritten Arabic Texts," IEEE Access, IEEE, USA, vol. 8, May 12, 2020, pp. 89882-89898, XP011790089, DOI: 10.1109/ACCESS.2020.2994248 Sections I, III, IV.
Sharif Aizaz et al: "Function Identification in Android Binaries with Deep Learning," 2019 Seventh International Symposium on Computing and Networking (CANDAR), IEEE, Nov. 25, 2019, pp. 92-101, XP033689718, DOI: 10.1109/CANDAR.2019.00019 Section IV.
Yuan Lufeng et al: "Intelligent Work Order Recognition System Based on End-to-End Deep Neural Network," 2019 IEEE $4^{th}$ International Conference on Image, Vision and Computing (ICIVC), IEEE, Jul. 5, 2019, pp. 387-391, XP033704570, DOI: 10.1109/ICIVC47709.2019.8980851 Sections I-III.

\* cited by examiner

HANDWRITING RECOGNITION WITH LANGUAGE MODELING

CROSS-REFERENCE TO RELATED APPLICATIONS

The present application claims the benefit of U.S. Provisional Patent Application No. 63/107,511, filed on Oct. 30, 2020, which is incorporated herein by reference in its entirety.

FIELD OF THE DISCLOSURE

The disclosure relates to systems, computer program products, and/or methods for improving handwriting recognition models, techniques, methods, and systems with language modeling.

BACKGROUND

Family history research is an increasingly popular area of interest. Conducting family history research often entails inspecting historical handwritten records, of which some family history research services and platforms have large collections. An example of such records is Census records. However, due to the vast scale of such records, manual transcription of such records, which is inherently laborious and costly, is simply not feasible.

Transcription is even more difficult in the case of historical records due to the often-degraded condition of the records (due to the passage of time), errors specific to the digitization and/or storage of the records, the vagaries of language which changes over time, the different styles of handwriting used by historical recordkeepers, spelling errors, the choice of abbreviations and acronyms by different enumerators, and other factors.

There is a need for automated handwriting recognition tools to democratize the valuable information contained in historical records. While attempts have been made to provide automated handwriting recognition tools, these are often trained on and intended for the interpretation of modern handwriting and modern documents rather than the above-mentioned challenges inherent in historical documents. Further, even state-of-the-art handwriting recognition models leave much to be desired in terms of accuracy and robustness, particularly those attempts that have been made at transcribing historical records.

For example, existing handwriting recognition solutions mostly rely on deep neural networks. Convolutional neural networks ("CNNs") are used to extract features from given images of handwritten words; attention-based architectures (i.e. transformers) or temporal sequence-based architectures (e.g. recurrent neural networks ("RNNs") and long-short term memory networks ("LSTMs")) are used to process features sequentially; then a decoding system is used to predict characters.

Some widely used handwriting recognition systems include CNNRNNCTC and CNN-Transformer-CTC and its variants. Considering a variant of the model that uses word beam search ("WBS") during its decoding phase, CNNRNNCTC utilizes some knowledge of language to check for a word completion given a predicted sequence of characters at each time stamp. However, the model is limited to the vocabulary the model is aware of and is not robust to spelling errors or incorrectly recognized character sequences. Given the commonness of spelling errors and new words, such as slang or uncommon names, terms, or acronyms, in many handwritten contexts, this weakness compromises the results for many, if not most, applications of handwriting recognition tools.

Handwriting recognition on Census record images, for example, involves transcribing index values corresponding to various fields that are broadly classified into four categories including numerical (numbers), small category (fewer than 25 classes), large category (greater than 25 classes), and alpha-numerical (indefinite classes). While existing deep-learning classification models have been implemented with some success on numerical and small categories, the existing approaches fall short on large categories and alpha-numeric fields due to the nature and complexity of the task of transcribing handwriting in such fields.

Rule-based approaches to solving the problem of large category classification, like defining and grouping field values, such as job titles and job descriptions, are both labor intensive and thus expensive as well as limited by the inherent inaccuracies in source field values. For example, when attempting to categorize job titles for Census handwriting recognition, the use by original Census enumerators of informal descriptions rather than job titles, spelling errors, and multiple ways of describing the same occupation propagate through the results which complicates attempts to efficiently and accurately interpret the handwriting. The same challenges apply to name and address fields, number fields, and others.

Handwriting recognition models thus suffer from their inability to account for the nuances of language, which limits their robustness. As a result, such models often product absurd outputs and are limited in their applicability.

In view of the foregoing, there is a need for an improved system, computer-program product, and/or method for improving handwriting recognition with language modeling.

SUMMARY

Embodiments of systems, computer-program products, and methods for improving handwriting recognition with language modeling advantageously address the drawbacks of existing approaches by facilitating the use of language modeling to improve the robustness of handwriting recognition.

Embodiments of the disclosure incorporate knowledge of spoken and written language in order to improve handwriting recognition models and methods for historical data. While historical data is described, it will be appreciated that the embodiments are not limited thereto, but rather apply to any suitable application, including optical character recognition ("OCR") and/or handwriting recognition of contemporary documents. The knowledge of spoken and written language is frequently referred to herein as "language modeling," e.g. the task of understanding the probability with which a sequence of tokens (such as characters, words, or sentences) will follow each other. Given the context from previous tokens, a language model attempts to predict the next tokens.

Embodiments of the disclosure advantageously incorporate a character-based language model into a handwriting recognition system, method, or product. In certain embodiments, the character-based language model may be provided as a bolt-on model, compatible with any existing handwriting recognition model, to leverage the knowledge of language to refine handwriting predictions. It has been found that character-based models advantageously include smaller vocabularies (e.g. alphabets and special characters) and their robustness to misspellings and infrequently used words, as opposed to word-based models that may be limited to the vocabularies of base words (e.g. "fast") and its different forms (e.g. "faster" and "fastest"). While character-based models have been described, it will be appreciated that other types of language models, including word-based models, may additionally or alternatively be used and are contemplated within the disclosure.

Character-based representations obtained from the language model have been surprisingly found to assist in refining the predictions of handwriting recognitions models and achieving higher accuracy. In particular, promising results have been obtained from applying methods, systems, and computer-program product embodiments according to the disclosure to U.S. Census records. However, it will be appreciated that the embodiments are not limited to handwriting recognition on U.S. Census records but rather may be applied to any suitable records in any suitable language and to any application involving field corrections. In embodiments, handwriting recognition using language modeling systems, methods, and approaches may be provided with a dictionary of words pertaining to the domain fields in/to which they are applied. Embodiments of the disclosure may be adapted to obtain more-effective representations for different words to improve a handwriting recognition system.

Embodiments also include the use of a loss prediction module to determine whether the character-based language model should be used to refine the predictions of the handwriting recognition model. The loss prediction module may be trained together with or separately from the handwriting recognition model and may receive as inputs one or more features from one or more components of the handwriting recognition model. A target loss between embeddings of predictions generated by the handwriting recognition model and manually generated labels is compared against a predicted loss output from the loss prediction module to determine a loss-prediction loss, in other words a loss of the loss, which is used to train one or both of the handwriting recognition model and the loss prediction module.

These and other features of the present disclosure will become better understood regarding the following description, appended claims, and accompanying drawings.

Figure 1:
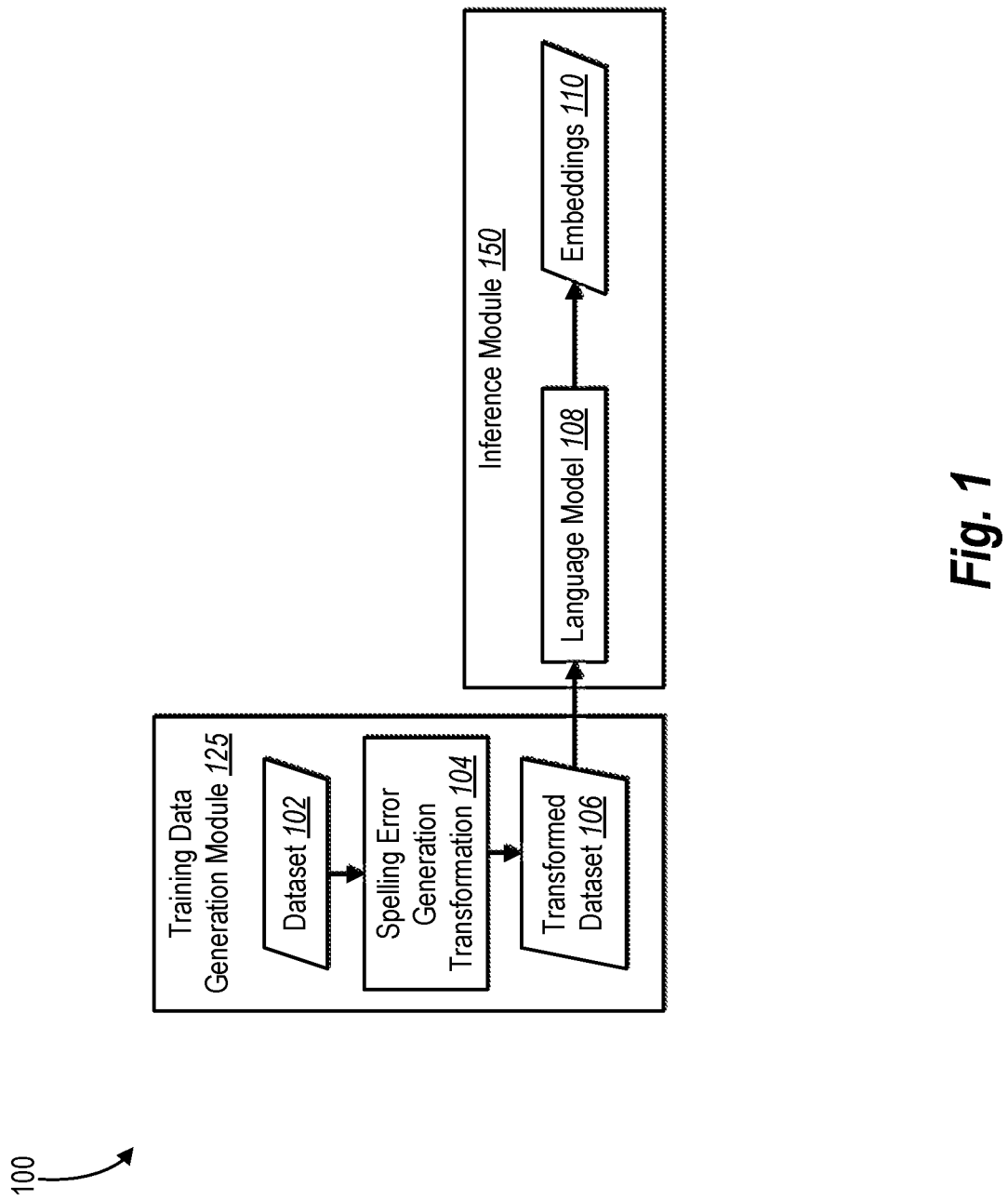
FIG. 1 is a diagram for training an instance of a language model according to embodiments of the present disclosure.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of systems and method for handwriting recognition using language modeling, and in no way limit the structures, configurations, or functions of systems and methods for handwriting recognition using language modeling, and components thereof, according to the present disclosure.

DETAILED DESCRIPTION OF VARIOUS EMBODIMENTS

A. Introduction

Although the embodiments of the disclosure are adapted for providing systems and methods for handwriting recognition using language modeling of historical documents and/or in conjunction with genealogical research platforms and services, it will be appreciated that the principles of the disclosure may be adapted to any suitable application. Systems and methods for handwriting recognition using language modeling may be provided for users of any application and/or for any type of handwriting recognition purposes, and are not limited to historical records. For example, the disclosed embodiments may be used in financial, cartographical, medical, legal, scientific, or other documents as suitable.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of systems and methods for improving handwriting recognition using language modeling, certain modules and features are described independently. The modules and features may be synergistically combined in embodiments to provide a search-result explanation system and method.

B. Embodiments of Systems and Methods for Improving Handwriting Recognition Using Language Modeling Embodiments of systems and methods for improving handwriting recognition using language modeling address shortcomings in the art by providing an automated approach to augmenting, refining, and/or improving the results of a handwriting recognition model by incorporating a language-based model, in embodiments a character-based language model, and/or a prediction loss module. State-of-the-art handwriting recognition models, which are configured to read one character at each step, achieve character accuracy of 87.2%, in one example or dataset, but word accuracy of only 52.6% in the same example, pointing up the need for improvement and refinement to the results.

For example, a state-of-the-art existing handwriting recognition model applied to the 1940 US Census may incorrectly interpret a handwritten name "Brooks Author" as "Brooks Authar," "Stephen John W" as "Stepper John W," "Stephen William E" as "Stapken William E," "Suell Emeline" as "Sell Eronsline," "Brooks Mary" as "Broo Mary," "Thomas W C" as "Thoms W C," and "Thomas Everlean" as "Thoma Everlean" as seen below in Table 1 in which the errant predictions are bolded relative to the actual labels, a k a the "ground truth."

TABLE 1

| Label | Handwriting Recognition Prediction |
| --- | --- |
| Brooks Author | Brooks Authar |
| Stephen John W | Stepper John W |
| Stephen William E | Stapken William E |
| Suell Emeline | Sell Eronsline |
| Brooks Mary | Broo Mary |
| Thomas W C | Thoms W C |
| Thomas Everlean | Thoma Everlean |

Such incorrect and often absurd results are a major challenge for genealogy research services and can create a negative experience for and impression on users of such genealogy research services, as it can then be difficult for users to link an ancestor to a pertinent historical record if the name is improperly predicted from the historical record. It has been surprisingly found, however, that a character-based language model provides needed improvement to word accuracy.

Language modeling may involve the task of understanding the probability with which a sequence of characters, words, and/or sentences will follow each other, such as predicting that a sentence " . . . the students opened their _____" will end with, e.g., books, laptops, exams, minds, etc. Character-based language models generally predict the next character and treat tokens as individual characters. By contrast, word-based language models generally predict the next word and treat tokens as individual words of different forms. It has been surprisingly found that character-based language models have the advantage of handling misspellings and infrequently used words (such as human slang) as well as having a lower model complexity compared to word-based language models.

In embodiments, the character-based language model is a chars2vec or chars2vec-based model. The language model is used to generate character-based word embeddings for field predictions, e.g. name field predictions, of handwriting recognition models used on/in, e.g., historical records such as US Census data. A character-based word embedding generated by a character-based language model according to embodiments advantageously maps similar words close to each other and dissimilar words distant from each other. The language model may additionally or alternatively be used to generate a dictionary of embeddings from various datasets, such as US name datasets, which can be referenced for names or other fields in the embedding space.

The character-based language model may be configured to receive a sequence of symbols and to generate an embedding, e.g. a vector of a selected dimension, from the sequence of symbols. The sequence may be provided as a binary vector, in embodiments a one-hot representation. The character-based language model may include long short-term memory models ("LSTMs") or layers, for example two LSTM layers, for generating the embedding as a vector. The character-based language model may be trained by providing a pair of words to the character-based language model and generating, respectively, a pair of embeddings therefrom. These embeddings are compared against each other to obtain an L2 distance and then normalized using a sigmoid function to output a binary value for similar (0) or dissimilar (1) words, i.e. an L2 norm of the difference between word embeddings.

A specific instance of a character-based language model, such as chars2vec, may be trained or adopted using a suitable dataset. In an embodiment in which the embodiments of systems and methods for improving handwriting recognition using language modeling are utilized for handwriting recognition of names, such as from historical records, the specific instance of the character-based language model is trained on a name dataset, such as a US name dataset comprising first and last names. In use cases where the embodiments are adapted to financial records or maps, by contrast, different datasets may be utilized for training.

This dataset may be augmented or adjusted with an automated spelling error generation process, such as with spelling errors commonly observed in a particular application or source, e.g. spelling errors commonly observed in US Census handwritten records. This can yield a novel name dataset comprising commonly observed spelling errors in US first and last names. Any suitable method, such as random replacement, may be utilized to insert spelling errors. In embodiments, no more than three errors at a time are inserted into a name to contain the computational requirements of training the models.

The specific instance of the character-based language model may be trained between the original US name dataset comprising first and last names and the augmented US name dataset with first and last names as well as commonly observed spelling errors. That is, the corresponding names from the two datasets may be fed into the character-based language model to determine similar, dissimilar word pairs. A string similarity metric such as Jaro-Winkler+ may be used with a suitable threshold value, such as 0.8. Alternatively or in addition, Jaro-Winkler, Levenshtein, or other suitable metrics may be used.

With a trained, specific instance of the character-based language model thus trained on specific field values (e.g. US names+spelling errors), the trained character-based language model can be used to generate name dictionary embeddings from the original US name dataset, the embeddings representing feasible names in an embedding space.

Additionally, alternatively, or subsequently, a handwriting recognition model may be used to generate predictions from input images. The predictions may be name predictions based on images of handwritten names. The predictions may be fed to the trained instance of the character-based language model to generate handwriting recognition embeddings.

With two separate embeddings—one comprising or corresponding to name dictionary embeddings based on the US name dataset along with the names corresponding to the embeddings, and the other comprising or corresponding to handwriting predictions—a nearest neighbor search, such as, in embodiments, a k-nearest neighbors search or an approximate nearest neighbor search and equivalents or variations thereof, may be used to search therebetween using any suitable modality.

Thus, in embodiments, the k most likely names from the name dictionary may be returned for any given handwriting prediction embedding. Thus an image predicted by the handwriting model to read "Prowince Daniel E" may, upon approximate nearest neighbor search between the two embedding spaces, return the most likely names from the name dictionary embeddings, including "Province Daniel E," "Provance Daniel E," and "Prince Dangel E," for example.

As an example of the improved accuracy provided by the embodiments of systems and methods for improving handwriting recognition using language modeling, the following labels (representing manually applied labels sometimes known as "ground truth"), handwriting recognition predictions, and retrieved names using character-based language model embedding-based predictions are presented in Table 2 below.

guage model according to embodiments of the disclosure to the more-common name "Warren."

The embodiments thus advantageously allow for improving on the accuracy of state-of-the-art approaches for phrase accuracy as more "top names" identified using language modeling are presented. Likewise, character error rate and word accuracy (i.e. each word in a full name) show improvements when using the disclosed embodiments. These results are shown below in Table 3.

TABLE 3

|  | Character Error Rate | Word Accuracy | Phrase Accuracy |
| --- | --- | --- | --- |
| State of the Art HWR | 16.146% | 66.078% | 51.012% |
| HWR with LM Top 1 | 18.497% | 66.226% | 51.069% |
| HWR with LM Top 2 | 17.143% | 67.293% | 52.298% |
| HWR with LM Top 3 | 16.427% | 68.212% | 53.404% |
| HWR with LM Top 4 | 15.921% | 68.997% | 54.296% |
| HWR with LM Top 5 | 15.524% | 69.723% | 55.165% |

As seen above, the character error rate, based on edit distance, decreases progressively for increasing numbers of top results, while the word accuracy (pertaining to components of full names) and phrase accuracy (pertaining to full names as a whole) progressively increase with increasing numbers of top results presented.

A learning loss module (e.g. a Learning Loss for Active Learning approach) may be utilized to determine whether to leverage the trained language model over the handwriting recognition model to make a final prediction. The determination may be based on predictions from the handwriting recognition model which are determined using the learning loss module to likely be incorrect. Training this module utilizes the language model-based embeddings of handwriting recognition model predictions as well as those of manual labels to learn differences therebetween. During inference, the module can determine how likely the model prediction is to be correct, which can then be used to trigger the use of the language model to refine the prediction.

TABLE 2

| Label | Handwriting Recognition Prediction | Retrieved Names with Character-Based Language Model Embeddings (Top Five) |
| --- | --- | --- |
| Alexander Delous | Alevander Deloris | Alexander Delois |
| Virginia M | Viginia M | Virginia M |
| Hicks T M | Haicks Tom | Hicks Tom |
| Warren | Warran | Warren |
| Brown J S | Brawn J S | Brown J S |
| Docia | DociaM | Docia |
| Ricks F T | Rieke Fet | Ricks Fret, Ricks Fent, Ricks Flet, Ricks Fett |
| McCord John | MCood John | McCord John |
| Madden Pinkey | Maddon Pinky | Madden Pinky |
| Russell Gwendolyn | Moe Wvendolyn | Moe Gwendolyn, Moye Gwendolyn, Moes Gwendolyn |
| Province Daniel E | Prowince Daniel E | Province Daniel E |
| Jean Autrey | Jean Autry | Jean Autrey |
| Edith May | Edieh May | Edith May |
| Galson Cecil | Galso Cecie | Galson Cecie, Galson Cecile, Galson Ceciel |
| Southard Flossie L | Souithard Flossie L | Southard Flossie L |
| Dorothy Nell | Dorothy Nel | Dorothy Nell |
| Elsie | Elise | Elsie |
| Hosia D | Dosia D | Hosia D |
| Agatha | Azatha | Agatha |

As seen, the use of a language model improves upon the initial handwriting recognition predictions by aligning the predictions closer to the actual name by using common names and misspellings to improve the predictions. Thus a prediction of "Warran" is accurately refined using a lan- It has been surprisingly found that using handwriting recognition using language modeling embodiments according to the present disclosure, in approximately 7.14% of cases using a CNNRNNCTC handwriting recognition model augmented as described herein using language model on 1940 US Census name fields, results were improved compared to 1.28% of cases where the results were not improved or were deleteriously affected. In 91.58% of cases there were no changes.

That is, the loss prediction module, which selectively directs the use of a trained language model based on predicted loss, may advantageously reduce the need to use a trained language model as described herein in over 90% of cases, correspondingly reducing the cost and complexity of operating a handwriting recognition approach as described while improving results over edge cases, e.g. about 10% of cases, where the results from the handwriting recognition model require refinement.

In order to determine whether the handwriting recognition prediction embeddings are similar to the label embeddings during inference, an input label is processed through the specific, trained instance of the character-based recognition model in parallel to the handwriting recognition model predictions, and the resulting embeddings are compared. A loss prediction module is provided. The loss prediction module may follow, in embodiments, the Learning Loss for Active Learning architecture described by Donggeun Yoo et al. That is, the loss prediction module may be designed using several layers of a target model to take multi-level network knowledge into consideration for loss prediction. The multi-level features are fused and map to a scalar value as the loss prediction. Given an input, the target model outputs a target prediction, and the loss prediction module outputs a predicted loss. The target prediction and the target annotation are used to compute a target loss to learn the target model. Then, the target loss is regarded as a ground-truth loss for the loss prediction module and used to compute the loss-prediction loss.

In inference, when a large loss is predicted by the loss prediction module, the embodiments of systems and methods for improving handwriting recognition using language modeling determine to use embeddings as described above instead of relying solely on the handwriting recognition prediction. This advantageously leverages the improved robustness and accuracy of the language modeling techniques described herein while minimizing the costs and complexity of model implementation and use by only using the trained character-based language model in specific instances where a large loss is predicted.

That is, during training, a target loss is determined based on a comparison between the handwriting recognition prediction embedding and the label embedding. The loss between the target loss and a loss prediction output from the loss prediction module becomes the loss-prediction loss used for determining whether to utilize the character-based language model during inference.

In embodiments the loss prediction module receives, as inputs, features from a convolutional neural network ("CNN") and/or a recurrent neural network ("RNN") of the handwriting recognition module. By contrast, the target loss receives as inputs embeddings generated by running, in parallel, handwriting recognition model predictions and handwriting recognition manual labels through the trained character-based language model, and comparing the embeddings against each other. The resulting loss-prediction loss, determined from the comparison of the target loss and the loss prediction module output, is fed back into the loss prediction module during training.

Thereafter, during use, the loss prediction module may output a predicted loss for each prediction based on the CNN and RNN features. To the extent the predicted loss exceeds a predetermined threshold, the results of the handwriting recognition model are refined/improved by feeding the handwriting recognition predictions to the trained character-based language model to generate handwriting recognition prediction embeddings. These may be used to generate, via approximate nearest neighbor search against a US name embedding dictionary, a closest name or names from the US name dataset.

Given any prediction of a field, such as a name, during an inference stage, a representation of the field provided by the character-based language model can be used as a query in an approximate neighbor search algorithm, such as ANN-HNSW, to retrieve the closest embeddings within an embedding space, e.g. the US name embedding dictionary. This approach allows the systems and methods for improving handwriting recognition using language modeling to deal with spelling errors in handwritten documents and/or incorrectly predicted characters. Thus the system and method embodiments enable a handwriting recognition model to correct predictions when the predictions are very different from likely field values, e.g. when the predictions are very different from the likely US names.

Turning to FIG. 1, an architecture 100 for training a language model, such as a character-based language model, is shown and described. The architecture 100 includes a training data generation module 125 and an inference module 150. In the training data generation module 125, a dataset 102, such as a US name dataset, is received. The dataset 102 is passed to a spelling error generation transformation 104. Spelling errors pertinent to the dataset and/or the application for the embodiment are added as suitable to the dataset 102. For example, spelling errors frequently observed in US names may be added at random to the US name dataset 102 to yield a transformed dataset 106. In this case, the transformed dataset 106 includes US names+spelling errors.

The transformed dataset 106 is passed to the inference module 150, which comprises an unspecific, untrained language model 108. The language model 108 may be a character-based language model, but the disclosure is not limited thereto, but rather may include a word-based language model or any other suitable language or other model. For example, language models, such as word2vec, GloVe, ULMFiT, ELMo, phrase2vec, ngram2vec, sentence2vec, BERT, spaCy, (or combinations, equivalents, and/or variants thereof) may be used in embodiments where the embodiments described herein are applied to free-form handwriting (for example) as opposed to US Census-style boxes which contain one or two words ordinarily.

The language model 108 outputs embeddings 110 from the transformed dataset 106. The embeddings 110 define a US name+spelling errors embeddings dictionary. The use of the embeddings 110 will be described in greater detail hereafter. The dictionary may vectorize words and arrange words that are syntactically similar together in clusters within a vectorized space. "Similar" may include words with misspellings that separate the words from each other by a set number of characters. Clusters may be distanced from each other in the vectorized space proportional to the differences between the words.

That is, the language model may represent each sequence of symbols of arbitrary length with a fixed-length vector, and the similarity in word spellings may be represented by a distance metric between vectors. chars2vec, for example, is advantageously not dictionary-based in that it does not store a fixed dictionary of words with corresponding vector representations, which minimizes the computation resources required for initialization and usage procedures. The language model may be based on a recurrent neural network that accepts a sequence of symbols of a word, rather than performing an analysis of the facts of letters or patterns presence in a word.

As a result, more changes such as additions, deletions, or replacements in a word result in the embedding thereof being proportionally farther away from the original word embedding in the embedding space. Other character-based language models that may be used include but are not limited to karpathy/char-rnn, Character-Level Deep Learning in Sentiment Analysis, CNN-based models such as Character-Aware Neural Language Models, Character-level Convolutional Networks for Text Classification, modifications, combinations, and/or equivalents thereof, or any other suitable language model.

chars2vec may include a framework that includes a fixed list of characters used for words vectorization, which are represented by various one-hot vectors fed to the model when the character appears in the text while characters absent in the list are ignored in the vectorization procedure. An instance of chars2vec may be particularly configured for processing English-based texts and to use a list of the most-popular ASCII characters, but any language or set of characters may be used.

The language model may have an architecture comprising a plurality of LSTMs ensembled together and configured to receive a sequence of one-hot vectors of an arbitrary length representing the sequence of characters in a word. The output from the ensembled LSTM layers is an embedding vector of the input word. The language model may be trained by taking two sequences of one-hot vectors representing two potentially different words as an input, creating their embeddings using the LSTM layers, calculating the norm of the difference between these embedding vectors, and feeding the difference into the last layer of the model with a sigmoid activation function.

Thus the language model may be trained on pairs of words, with "similar" training words labeled with a 0 value, and a pair of dissimilar words labeled with a value of 1, with "similarity" being defined in embodiments as a metric of the number of substitutions, additions, and removals of characters that have to be performed to make one word from the other. This allows the model to categorize words as similar or the same words with only typos or spelling differences separating them, or as different, unrelated words. The size of a training dataset—comprising, in embodiments, an original dataset and a modified dataset comprising the contents of the original dataset with changes having been made thereto—along with the number of words in each subset, the maximum number of changing operations upon a word within one subset, define the result of model training and the model's vectorization rigidity.

A sigmoid function of the language model may have only one edge, the weight of which can be adjusted during the training process. This applies a monotonous function to the embedding vectors difference norm. As the sigmoid function outputs 0 for "similar" word pairs and 1 for "dissimilar" word pairs, during training the LSTM layers learn to form neighboring embedding vectors for the similar word pairs and distant embedding vectors for dissimilar word pairs.

In other embodiments, a permutation language model, e.g. a language model that is trained to predict one token given preceding context like a tradition language model, configured to capture bidirectional context by training an autoregressive ("AR") model, such as XLNet, on all possible permutations of words in a sequence may be used.

Figure 2:
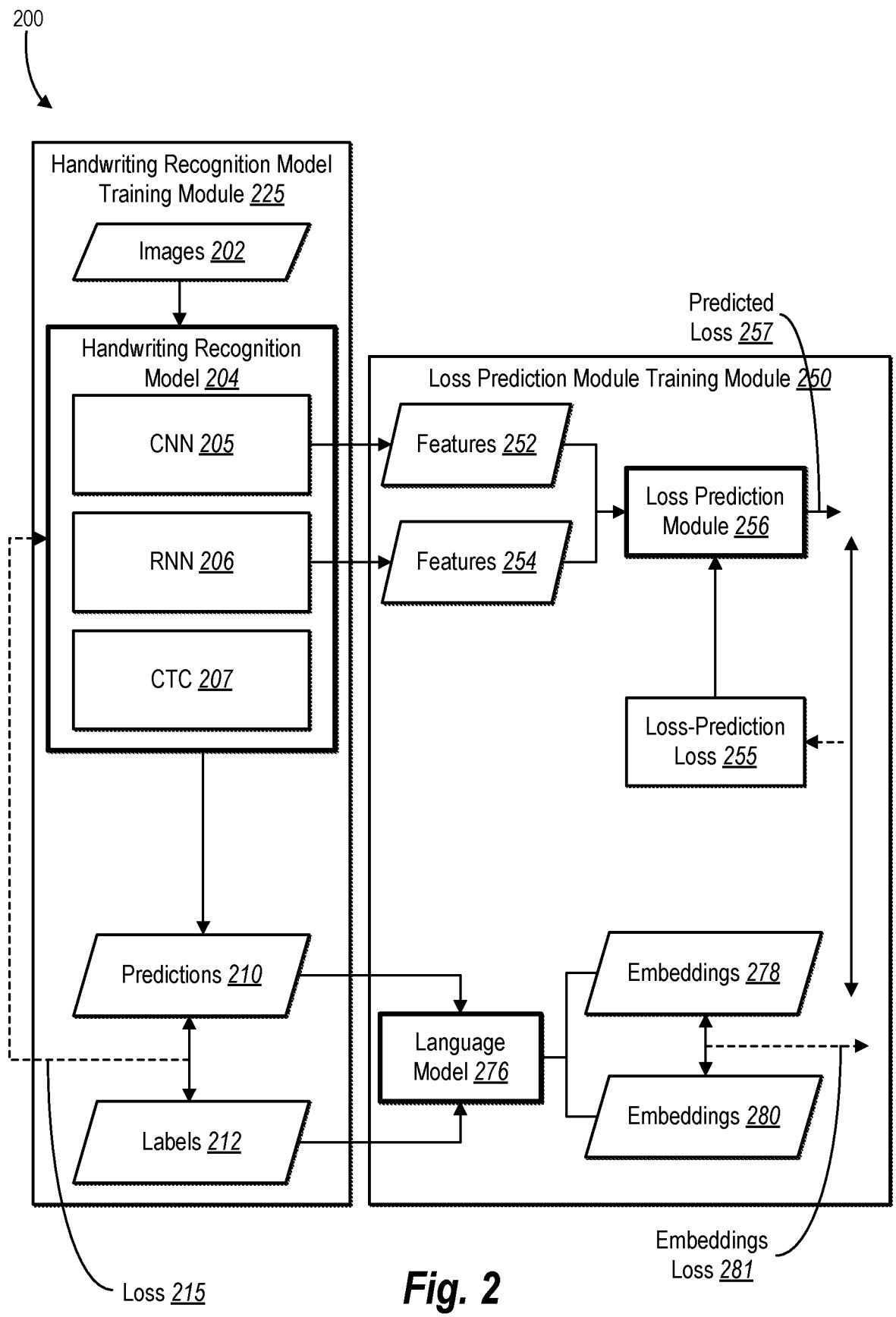
FIG. 2 is a diagram of training a handwriting recognition model and loss prediction module according to embodiments of the present disclosure.

Turning now to FIG. 2, an architecture 200 for handwriting recognition model and loss prediction module training is shown and described. The architecture 200 includes a handwriting recognition model training module 225 and a loss prediction module training module 250. The handwriting recognition model training module 225 includes receiving or providing one or more images 202, such as handwritten name field images. The images may pertain to any suitable handwriting recognition fields, including historical and contemporary documents and any suitable task related thereto. The images 202 are passed to a handwriting recognition model 204. The handwriting recognition model 204 may include a CNN 205, a RNN 206, and/or a connectionist temporal classification ("CTC") model 207, that is a CNNRNNCTC model. The handwriting recognition model 204 may be any suitable model for handwriting recognition, such as the model described at towardsdatascience.com with regards to beam search decoding in CTC-trained neural networks.

In particular, the handwriting recognition model 204 may be a neural network comprising CNN layers, RNN layers, and a final CTC layer. The neural network is configured to output a matrix containing character-probabilities for each time-step (horizontal position), which matrix can be decoded to obtain a final text prediction. Best path, beam search, and/or word beam search decoding may be utilized for text decoding, which advantageously lend themselves to integration with a character-level or character-based language model.

Best path decoding may include concatenating the most probable characters per time-step which yields the best path, then undoing the encoding by first removing duplicate characters and then removing all blanks, yielding a recognized text prediction. Beam search decoding, by contrast, iteratively creates text candidates (beams) and scores them. At each time-step, only the best-scoring beams from the previous time-step are kept. A beam width specifies the number of beams to keep. Ultimately the highest-scoring beam is returned. Word beam search decoding, by contrast, creates text candidates ("beams," starting from an empty beam and adding all possible characters) which are scored, with the "best" beams per iteration retained based on a beam "width."

As seen in FIG. 2, the step of decoding is performed after or as part of the handwriting recognition model 204, including the CNN 205, RNN 206, and CTC 207 which are configured to output a matrix decoded by any suitable modality, such as best path decoding, beam search decoding, and/or word beam search decoding, among other suitable modalities, to yield a handwriting recognition model prediction 210.

Manually transcribed labels 212 may be compared against corresponding predictions 210, with the resulting loss 215 backpropagated to the handwriting recognition model 204 to train the handwriting recognition model 204 by, for example, modifying one or more weights of one or more of the CNN 205, RNN 206, and CTC 207. The modifying of the one or more weights may be proportional to a magnitude of the resulting loss 215. Of note, in embodiments the loss 215 is computed based on a comparison of the embeddings generated by processing both the predictions 210 and the manually generated labels 212 through the trained character-based language model 276 to yield embeddings of the labels and predictions, respectively.

The loss prediction module training module 250 comprises a loss prediction module 256 configured to receive, as inputs, features 252, 254 from the CNN 205, RNN 206 of the handwriting recognition module 204. The loss prediction module 256 may be a loss prediction module as described by Donggeun Yoo et al., configured to take multi-layer feature maps as inputs, these being extracted between mid-level blocks of the target model, in this case from the CNN 205 and the RNN 206 of the handwriting recognition model 204. These multiple connections facilitate choosing necessary information between layers for loss prediction.

Each feature map is reduced to a fixed-dimension feature vector through a global average pooling ("GAP") layer and a fully connected ("FC") layer before being output through a rectified linear unit ("ReLU"). Then all features are concatenated and pass through another FC layer yielding a scalar value as a predicted loss. Learning such as two-story module requires much less memory and computation than the target model. The loss prediction module 256 may be learned concurrently with the target model 204. The predicted loss 257 output from the loss prediction module 256 may be compared against an embedding loss as will be described hereafter.

The predictions 210 may be fed to a trained language model 276, e.g. a trained, specific instance of a character-based language model, like chars2vec. In parallel, manually labeled handwriting recognition labels 212 are fed to the model 276. Embeddings 278, 280, respectively, are generated using the trained model 276 for the predictions 210 and the manually labeled handwriting recognition labels 212. An embedding loss 281 is determined based on a comparison of the embeddings 278, 280. The embedding loss 281 may be determined based on any suitable metric, e.g. by determining a sigmoid (L2 norm of difference between word embeddings, with 0 being completely similar and 1 being completely different).

The predicted loss 257 and the embedding loss 281 may be compared to yield a loss-prediction loss 255, with the loss-prediction loss 255 being used to train the loss prediction module 256. That is, one or more weights of the loss prediction module 256 may be adjusted based on the loss-prediction loss 255, and the degree to which the weights are adjusted may be proportional to a magnitude of the loss-prediction loss 255. This yields a trained loss prediction module 256 configured to accurately assess a predicted loss and whether the trained character-based language model should be used.

Figure 3:
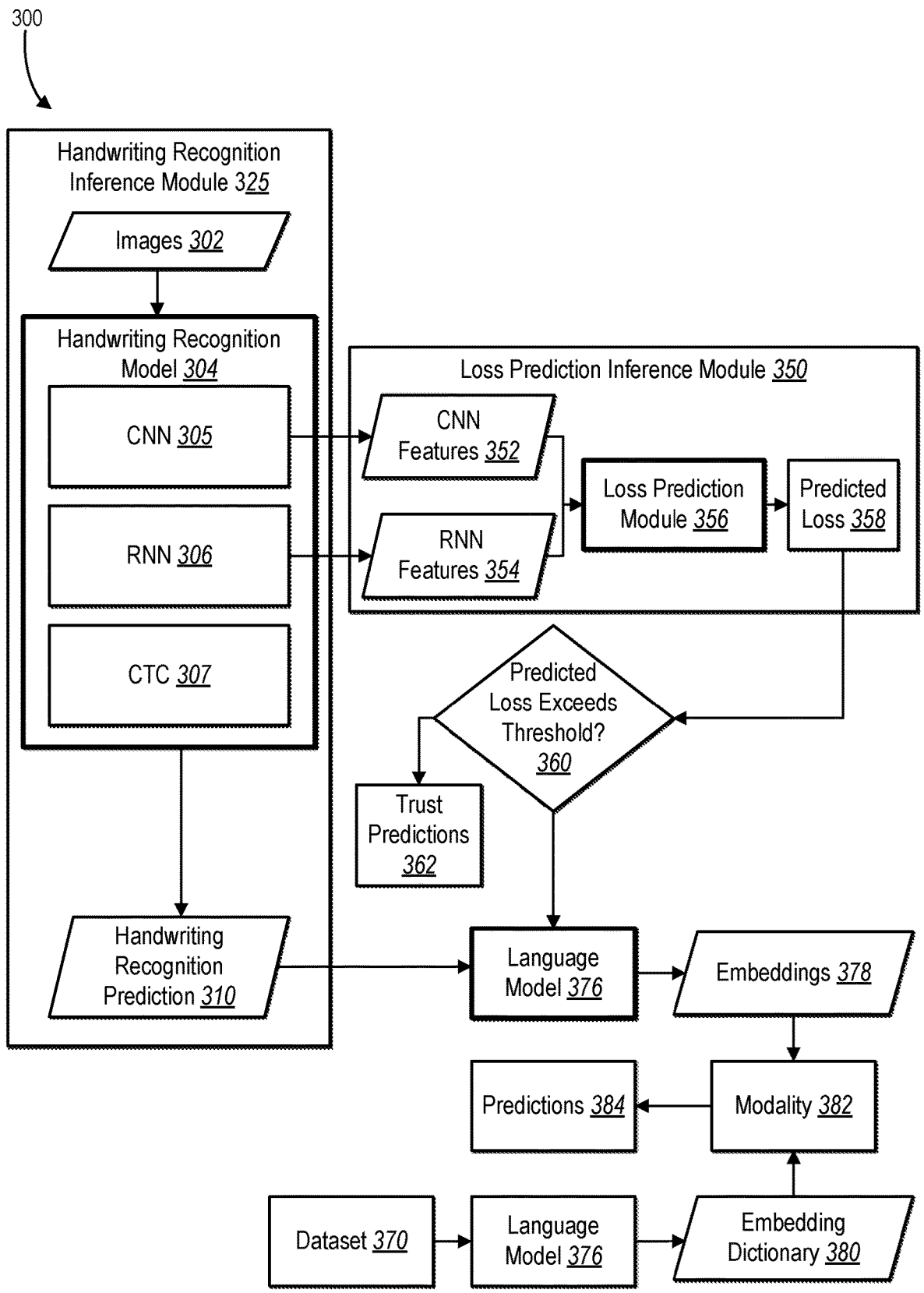
FIG. 3 is a diagram of using a trained handwriting recognition model and loss prediction module for inference of handwritten fields according to embodiments of the present disclosure.

Turning to FIG. 3, an architecture 300 for inferring handwriting recognition predictions is shown and described. The architecture 300 includes a handwriting recognition inference module 325 and a loss prediction inference module 350. The handwriting recognition inference module 325 includes receiving or providing one or more images 302, such as handwritten name field images, and passing the images 302 to a trained handwriting recognition model 304 comprising a CNN 305, a RNN 306, and a CTC 307. While CNNRNNCTC-based handwriting recognition models have been described, it will nevertheless be appreciated that the disclosure is not limited thereto but rather includes other handwriting recognition models with other components as suitable.

The handwriting recognition inference module 325 further includes decoding a prediction from the handwriting recognition model 304 to text to yield a handwriting recognition prediction 310, for example using best path decoding, beam search decoding, and/or word beam search decoding, or any other suitable decoding modality. In embodiments, the prediction 310 is the terminus of the inference process due to a high likelihood of accuracy and no further determinations utilizing a language model are undertaken.

The loss prediction inference module 350 includes receiving CNN features 352 and RNN features 354 and feeding the same to a trained loss prediction module 356, which may be similar and/or trained according to the loss prediction module 256 described regarding FIG. 2. The trained loss prediction module 356 generates a predicted loss 358 based on the received features 352, 354.

The architecture 300 provides for determining at 360 whether the predicted loss 358 exceeds a predetermined threshold loss value. If not, no further analysis is conducted and it is determined 362 to trust the predictions 310 from the handwriting recognition model 304. If, however, it is determined at 360 that the predicted loss exceeds the predetermined threshold value, the predictions 310 are fed to a trained language model 376. This may be a trained character-based language model as described regarding FIGS. 1 and 2.

The trained language model 376 receives the predictions 310 from the handwriting recognition inference module 325 and generates handwriting recognition prediction embeddings. In parallel, the trained language model 376 generates or has generated an embedding dictionary 380 pertinent to the handwriting recognition predictions 310 from a suitable dataset 370. In one embodiment, the embedding dictionary 380 is a US name dataset generated using the trained language model 376 using a US name dataset 370. This is particularly pertinent when the handwriting recognition inference architecture 300 is applied to determining name field values from a US Census document. While name fields have been described, it will be appreciated that the architecture 300 may be adapted to any suitable disposition, including numbers, addresses, symbols, prose, or any other type of handwriting specific to any type of document or application.

An approximate nearest neighbor search modality 382 is used based on the embeddings 378, 380 to identify one or more close, i.e. similar, field values. That is, similar field values in the embedding dictionary 380 that are similar to the predictions 310 are identified using approximate nearest neighbor search (i.e. the predictions 310 are used as a query for approximate nearest neighbor search), and the one or more similar field values are provided as improved predictions 384 relative to the predictions 310.

The described approach of embodiments of systems and methods for improving handwriting recognition with language modeling advantageously leverages the improved results of applying language modeling to handwriting recognition while improving the performance of a system, method, or computer-program product configured to perform handwriting recognition. In particular, the computing resources are significantly reduced by providing a loss prediction module that determines whether a language model need not be used in the first place. Thus computing resources are minimized without compromising the accuracy of results.

Figure 4A:
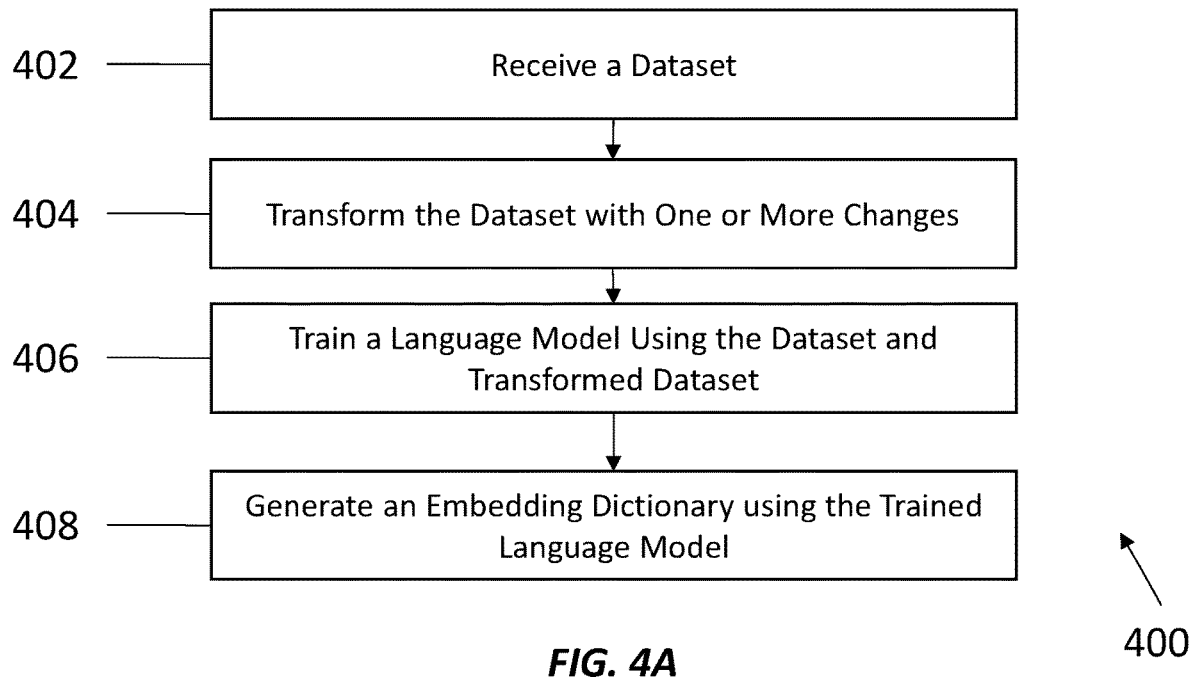
FIG. 4A is a diagram of a method according to an embodiment of the present disclosure.
Figure 4B:
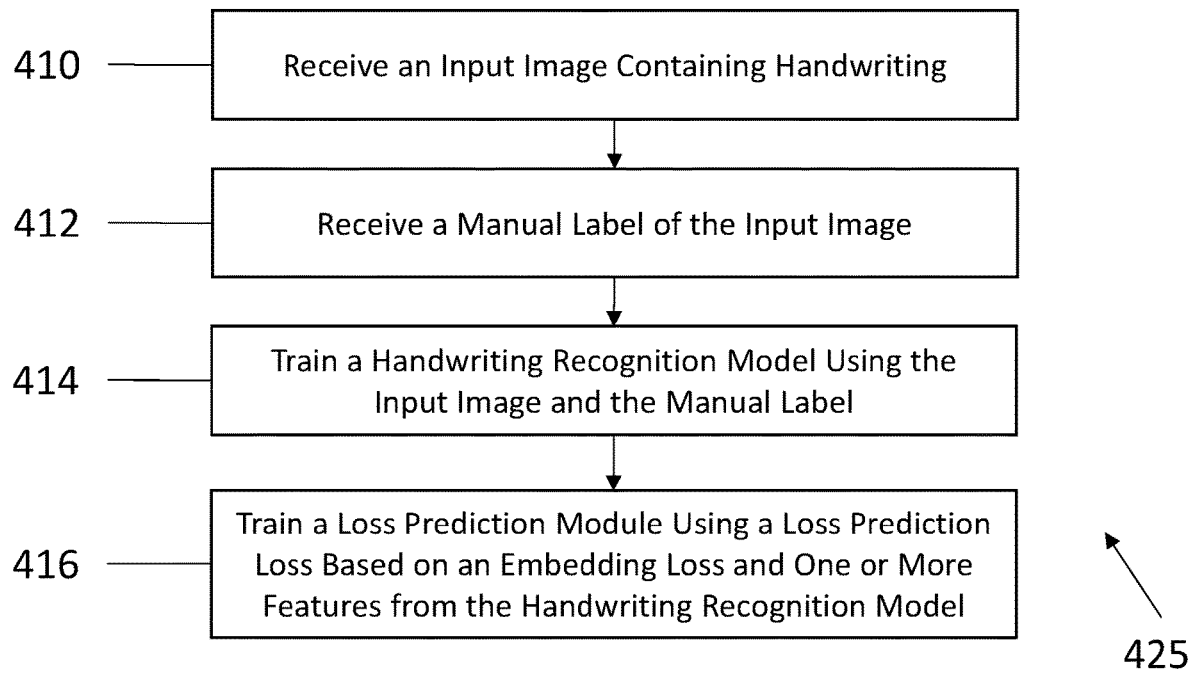
FIG. 4B is a diagram of a method according to another embodiment of the present disclosure.
Figure 4C:
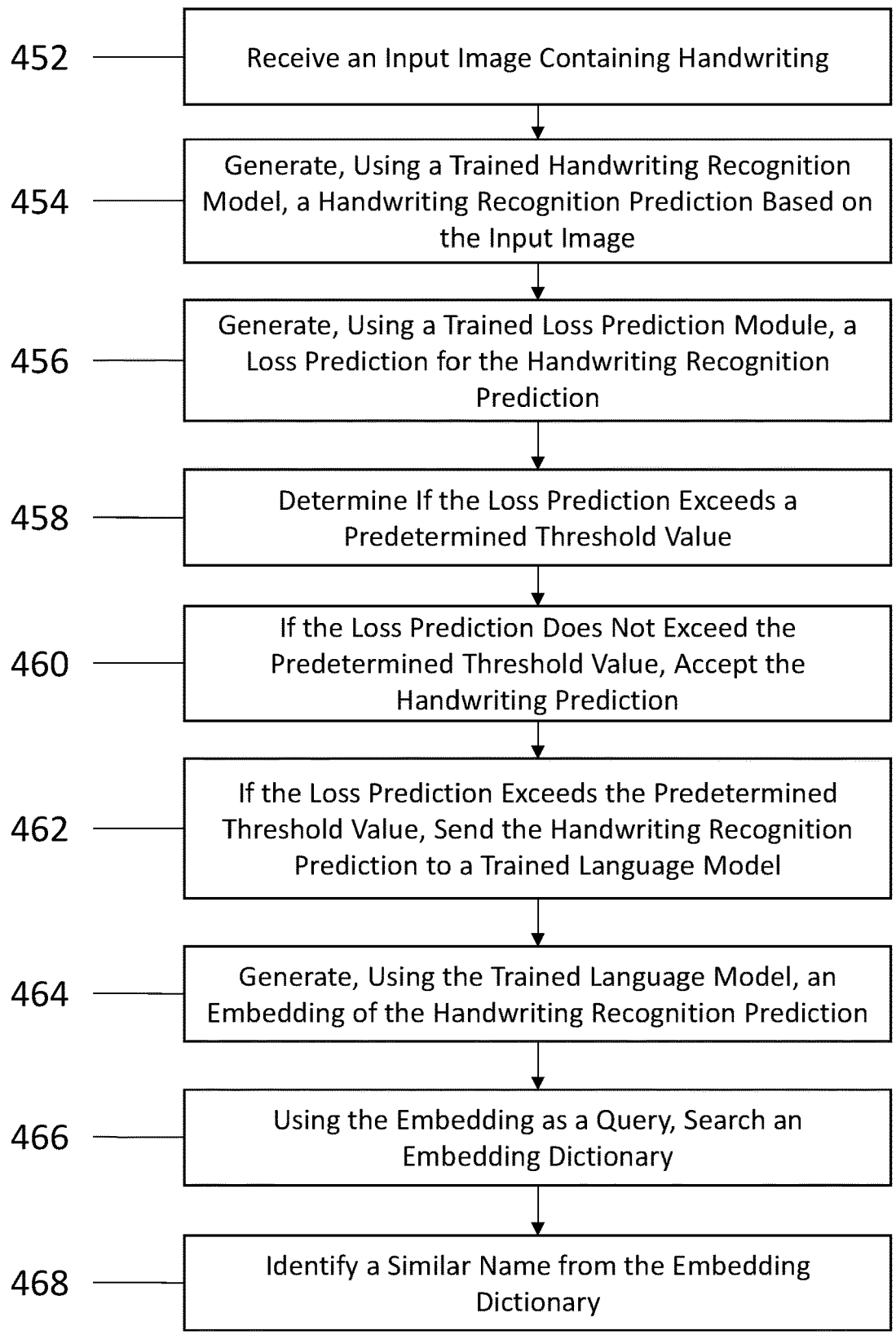
FIG. 4C is a diagram of a method according to yet another embodiment of the present disclosure.

FIGS. 4A through 4C illustrate exemplary methods of handwriting recognition using language modeling according to the disclosed examples. FIG. 4A depicts a method 400 of training a language model and performing inference using the same. FIG. 4B depicts a method 425 of training a handwriting recognition model and/or loss prediction module. FIG. 4C depicts a method 450 of performing handwriting recognition or inference using one or more models trained, for example, according to the embodiments of FIGS. 4A and/or 4B.

Turning to FIG. 4A, the method 400 includes a step 402 of receiving a dataset. The received dataset may be a dataset pertinent to a downstream application of a handwriting recognition model and/or language model; when handwriting recognition or inference is to be performed upon the name field of historical documents such as US Census records, the dataset may be pertinent to US names. The method 400 includes a step 404 of transforming the dataset with one or more changes. The step 404 may include any suitable method of changing the received dataset. Random or regular variations may be inserted into the dataset. These variations may be tailored to the types of errors frequently observed in downstream applications, such as historical document handwriting recognition. In embodiments the variations may be limited by a number of variations, e.g. three variations, to a single field value such as a name, but the number may be fewer or greater. Any suitable modality may be applied, as known to persons skilled in the art, for inserting errors into a dataset.

The method 400 may further include a step 406 of training a language model using the dataset and the transformed dataset. The language model may be a character-based language model such as chars2vec. The step 406 of training the language model may include feeding the dataset and the transformed dataset to the model in parallel, generating embeddings for each respective field value, and comparing corresponding embeddings. The step 406 of training the language model may further include a step of applying a sigmoid function to assign a value from 0 to 1 for the comparisons between embeddings, and then feeding the value to a layer of the model, such as a final LSTM layer, and adjusting one or more weights of the model based on the value.

The method 400 may further include a step 408 of generating an embedding dictionary using the trained language model. The embedding dictionary may be a name dictionary embedding in cases where name fields are a final disposition for the language model and/or a handwriting recognition model. Any suitable dictionary may be provided and any suitable format thereof may be utilized. In embodiments the language model outputs a vector space comprising clusters of words that are distanced from each other based on similarity to each other.

Turning to FIG. 4B, a method 425 for training a handwriting recognition model and/or a loss prediction module is shown and described. The method 425 includes a step of receiving an input image containing handwriting. The input image may be of a historical document or any other suitable document, such as a financial record, medical record, legal document, or otherwise. The training method 425 includes a step 410 of receiving, in embodiments in parallel, a manual label 412 of the input image.

A step 414 includes training a handwriting recognition model using the manual label and the input image. The handwriting recognition model may be a CNNRNNCTC model or any other suitable model. For example, the handwriting recognition model may comprise a CNN, RNN, and CTC and may be configured to decode a prediction matrix output therefrom to text. The decoding may be best path decoding, beam search decoding, and/or word beam decoding, or any other suitable modality. The handwriting recognition model may be trained 414 by determining a loss by comparing a prediction from the handwriting recognition model for the input image against the manual label, a k a the "ground truth." The loss determined therebetween is used to modify one or more weights of one or more components of the handwriting recognition model until the loss is minimized or eliminated.

A step 416 of training a loss prediction module using a loss prediction loss based on the manual label and one or more features from the handwriting recognition model may be performed in parallel, simultaneously to, or subsequently to the step 414. The step 416 includes extracting one or more features from the handwriting recognition model, for example CNN- and RNN-derived features, and feeding the one or more features to a loss prediction module, which outputs a loss prediction.

Separately, an embedding loss between the handwriting recognition model predictions and manual labels is generated by feeding both the handwriting recognition model predictions and the manual labels through a trained language model, trained for example according to the method 400 above. Embeddings generated by the trained language model for corresponding pairs of manual labels and handwriting recognition model predictions are compared against each other to determine an embedding loss.

The embedding loss and the predicted loss from the loss prediction module are compared against each other to determine a loss-prediction loss, in other words a loss of the loss. The loss-prediction loss is fed back to the loss prediction module to adjust one or more parameters and/or weights of the loss prediction module until the loss-prediction loss is minimized.

Turning to FIG. 4C, a method 450 of inferring handwriting recognition predictions using language modeling is shown and described. The method 450 includes a step 452 of receiving an input image containing handwriting, such as a digitized image of a US Census record with handwritten names thereon. A step 454 includes generating, using a trained handwriting recognition model, trained for example according to the method 425 above, a handwriting recognition prediction based on the input image. The prediction may be a text prediction based on the input image.

A step 456 includes generating, using a trained loss prediction module, a loss prediction for the handwriting recognition prediction. The step 456 may be performed simultaneously to, in parallel to, or subsequently to the step 454. The step 456 may include receiving one or more features from components of the trained handwriting recognition model and determining the loss prediction therefrom. The loss prediction module may be trained according to the method 425 above.

A step 458 includes determining whether the loss prediction obtained at step 456 exceeds a predetermined value. The predetermined value may be any suitable value using any suitable metric. If the loss prediction is determined to not exceed the predetermined value, the handwriting recognition model prediction is accepted as correct 460. If, however, the loss prediction is determined to exceed the predetermined value, the handwriting recognition model prediction is sent to a trained language model 462. The trained language model may be a character-based language model such as chars2vec trained according to the method 400 above.

A step 464 of generating an embedding from the prediction using the trained language model is performed. The embedding is used 466 as a query to search an embedding dictionary, which may be generated according to the method 400 above. If the prediction is a name field prediction, for instance, a name dictionary embedding generated using a US name dataset according to the method 400 is used for searching. The search modality may be any suitable search modality, in embodiments an approximate nearest neighbor search. Alternatively the search may be performed using kNN, k-d trees, vantage point trees, ball trees, locality sensitive hashing, or any other suitable modality.

The step 464 may yield any suitable number of "close" values identified based on the query from the dictionary embeddings, such as a single closest value, or a suitable number of closest values such as two, three, etc. It will be appreciated that the methods 400, 425, 450 described herein may include more, fewer, or other steps. Additionally, steps may be performed in any suitable order.

It has been surprisingly found that the handwriting recognition using language modeling system, method, and computer-program product embodiments advantageously enable improved word accuracy relative to state-of-the-art modalities. The results for 1940 US Census names are shown in Table 4 below:

TABLE 4

| Handwriting Recognition Model | Description | Word Accuracy (%) |
| --- | --- | --- |
| Best Path | CNNRNNCTC with best path decoder | 50.75 |
| Beam Search | CNNRNNCTC with beam search decoder | 50.86 |
| Word Beam Search | CNNRNNCTC with word beam search decoder | 55.82 |

As seen, existing approaches to handwriting recognition using any decoding modality are in need of improvement. Using a subset of the dataset used for the results shown in Table 3 above, Table 4 shows results for different approaches to handwriting recognition, where "ANN" refers to the use of language modeling, such as chars2vec, as described herein.

TABLE 5

| Best Path | CNNRNNCTC with best path decoder | 68.71 |
| --- | --- | --- |
| Best Path + ANN | CNNRNNCTC with best path decoder + ANN | 69.09 |
| Best Path + ANN + Loss Prediction Module | CNNRNNCTC with best path decoder + ANN + Loss Prediction Module | 69.58 |

It will be appreciated that while the use of a best path decoder has been shown in the results of Table 4, the disclosure is by no means limited thereto, but rather beam search decoding and/or word beam search decoding or any other suitable decoder may alternatively or additionally be used. The embodiments, as seen above, advantageously improve on state-of-the-art results by providing an improved architecture for resolving the issues of uncommon names, spelling errors, and other issues endemic with name recognition in Census documents.

In embodiments applied to fields other than names and/or documents other than Census documents, the embodiments described herein likewise advantageously facilitate improved recognition of handwritten fields, including uncommon or misspelled field values, while minimizing the cost and complexity of implementing the solution by only implementing a cooperating language model when necessary. Thus, while the integration of the Loss Prediction Module improves on the state-of-the-art results, it also reduces the cost of utilizing language modeling by only using language modeling when necessary, that is when a loss prediction meets a predetermined threshold.

Figure 5:
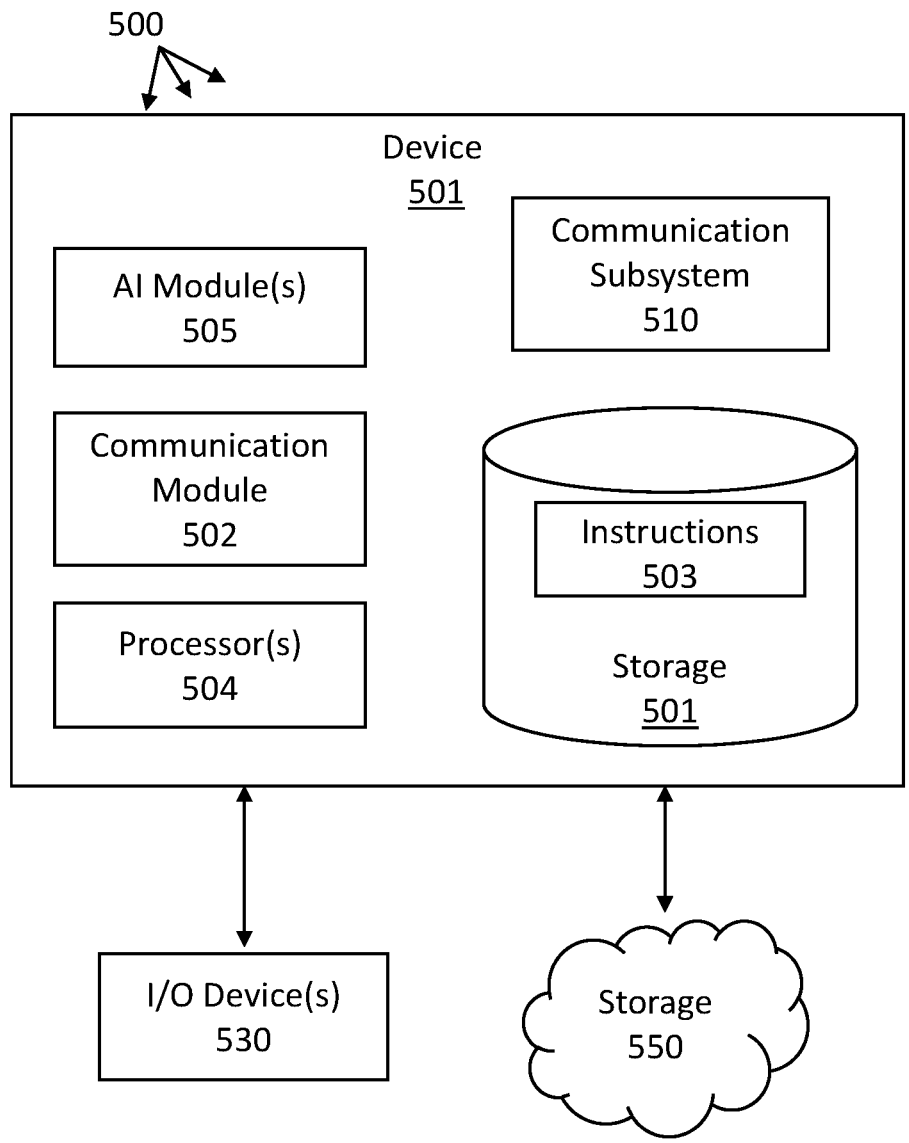
FIG. 5 is a diagram of a computer system for handwriting recognition using language modeling according to the present disclosure.

FIG. 5 illustrates an example computer system 500 comprising various hardware elements, in accordance with some embodiments of the present disclosure. The computer system 500 may be incorporated into or integrated with devices described herein and/or may be configured to perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

In the illustrated example, the computer system 500 includes a communication module 502, one or more processor(s) 504, one or more input and/or output device(s) 530, and a storage 501 comprising instructions 503 for implementing a handwriting recognition using language modeling system and/or method according to the disclosure. The computer system 500 may be implemented using various hardware implementations and embedded system technologies. For example, one or more elements of the computer system 500 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 500 may be communicatively coupled via the communication module 802. While the communication module 502 is illustrated as a single connection for purposes of clarity, it should be understood that the communication module 502 may include various numbers and types of communication media for transferring data between pertinent components such as hardware elements. For example, the communication module 502 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication medium 502 may include one or more buses connecting pins of the hardware elements of the computer system 500. For example, the communication medium 502 may include a bus that connects the processor(s) 504 with the storage 501, referred to as a system bus, and a bus that connects the storage 501 with the input device(s) and/or output device(s) 530, referred to as an expansion bus. The system bus may itself consist of several buses, including an address bus, a data bus, and a control bus. The address bus may carry a memory address from the processor(s) 504 to the address bus circuitry associated with the storage 501 in order for the data bus to access and carry the data contained at the memory address back to the processor(s) 504. The control bus may carry commands from the processor(s) 504 and return status signals from the storage 501. Each bus may include multiple wires for carrying multiple bits of information and each bus may support serial or parallel transmission of data.

The processor(s) 504 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. The processor(s) 504 may include one or more multi-core processors, in which each core may read and execute program instructions concurrently with the other cores, increasing speed for programs that support multithreading.

The input device(s) 530 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 530 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 530 may include one or more of various devices that convert information into human-readable form, such as without limitation a display device, a speaker, a printer, a haptic or tactile device, and/or the like. The output device(s) 530 may also include devices for writing to removable storage devices or other removable media, such as those described in reference to the input device(s). The output device(s) 530 may also include various actuators for causing physical movement of one or more components. Such actuators may be hydraulic, pneumatic, electric, and may be controlled using control signals generated by the computer system 500.

The communications subsystem 510 may include hardware components for connecting the computer system 500 to systems or devices that are located external to the computer system 500, such as over a computer network. In various embodiments, the communications subsystem 510 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 502.11 device, a Wi-Fi device, a Wi-Max device, a cellular device), combinations thereof, or other suitable possibilities.

The storage 501 may include the various data storage devices of the computer system 500. For example, the storage 501 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 504 and the storage 501 are illustrated as being separate elements, it should be understood that the processor(s) 504 may include varying levels of on-processor memory, such as processor registers and caches that may be utilized by a single processor or shared between multiple processors.

The storage 501 may include a main memory, which may be directly accessible by the processor(s) 504 via the memory bus of the communication module 502. For example, the processor(s) 504 may continuously read and execute instructions stored in the main memory. As such, various software elements may be loaded into the main memory so as to be read and executed by the processor(s) 504 as illustrated in FIG. 5. Typically, the main memory is volatile memory, which loses all data when power is turned off and accordingly needs power to preserve stored data.

The main memory may further include a small portion of non-volatile memory containing software (e.g., firmware, such as BIOS) that is used for reading other software stored in the storage 501 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 500 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 503, which are executable by the computer system 500. In one example, such instructions 503 may be received by the computer system 500 using the communications subsystem 510 (e.g., via a wireless or wired signal that carries the instructions 503), carried by the communication module 502 to the storage 501, stored within the storage 501, read into the main memory, and executed by the processor(s) 504 to perform one or more steps of the described methods.

In another example, the instructions 503 may be received by the computer system 500 using the input device(s) 530 (e.g., via a reader for removable media), carried by the communication module 502 to the storage 501, stored within the storage 501, read into the main memory, and executed by the processor(s) 504 to perform one or more steps of the described methods.

In some embodiments of the present disclosure, the instructions 503 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 500. For example, the non-transitory computer-readable medium may be the storage 501 and/or the cloud storage 550 (as shown in FIG. 5).

In some cases, the non-transitory computer-readable medium may be separate from the computer system 500. In one example, the non-transitory computer-readable medium may be a removable medium provided to the input device(s) 530 (as shown in FIG. 5), such as those described in reference to the input device(s) 530, with the instructions 503 being read into the computer system 500 from the input device(s) 530. In another example, the non-transitory computer-readable medium may be a component of a remote electronic device, such as a mobile phone, that may wirelessly transmit a data signal that carries the instructions 503 to the computer system 500 and that is received by the communications subsystem 510 (as shown in FIG. 5).

The instructions 503 may take any suitable form to be read and/or executed by the computer system 500. For example, the instructions 503 may be source code (written in a human-readable programming language such as Java, C, C++, C#, Python), object code, assembly language, machine code, microcode, executable code, and/or the like. In one example, the instructions 503 are provided to the computer system 500 in the form of source code, and a compiler is used to translate the instructions 503 from source code to machine code, which may then be read into the main memory for execution by the processor(s) 504.

As another example, instructions 503 are provided to the computer system 500 in the form of an executable file with machine code that may immediately be read into the main memory for execution by processor(s) 504. In various examples, the instructions 503 may be provided to the computer system 500 in encrypted or unencrypted form, compressed or uncompressed form, as an installation package or an initialization for a broader software deployment, among other possibilities.

In one aspect of the present disclosure, a system (e.g., the computer system 500) is provided to perform methods in accordance with various embodiments of the present disclosure. For example, some embodiments may include a system comprising one or more processors (e.g., the processor(s) 504) that are communicatively coupled to a non-transitory computer-readable medium (e.g., the storage 501). The non-transitory computer-readable medium may have instructions (e.g., the instructions 503) stored thereon that, when executed by the one or more processors, cause the one or more processors to perform the methods or aspects thereof as described in the various embodiments.

In another aspect of the present disclosure, a computer-program product that includes instructions (e.g., instructions 503) is provided to perform methods in accordance with various embodiments of the present disclosure. The computer-program product may be tangibly embodied in a non-transitory computer-readable medium (e.g., the storage 501). The instructions may be configured to cause one or more processors (e.g., the processor(s) 504) to perform the methods or aspects thereof as described in the various embodiments.

In another aspect of the present disclosure, a non-transitory computer-readable medium (e.g., the storage 501) is provided. The non-transitory computer-readable medium may have instructions (e.g., instructions 503) stored thereon that, when executed by one or more processors (e.g., processor(s) 504), cause the one or more processors to perform the methods or aspects thereof as described in the various embodiments.

Figure 6:
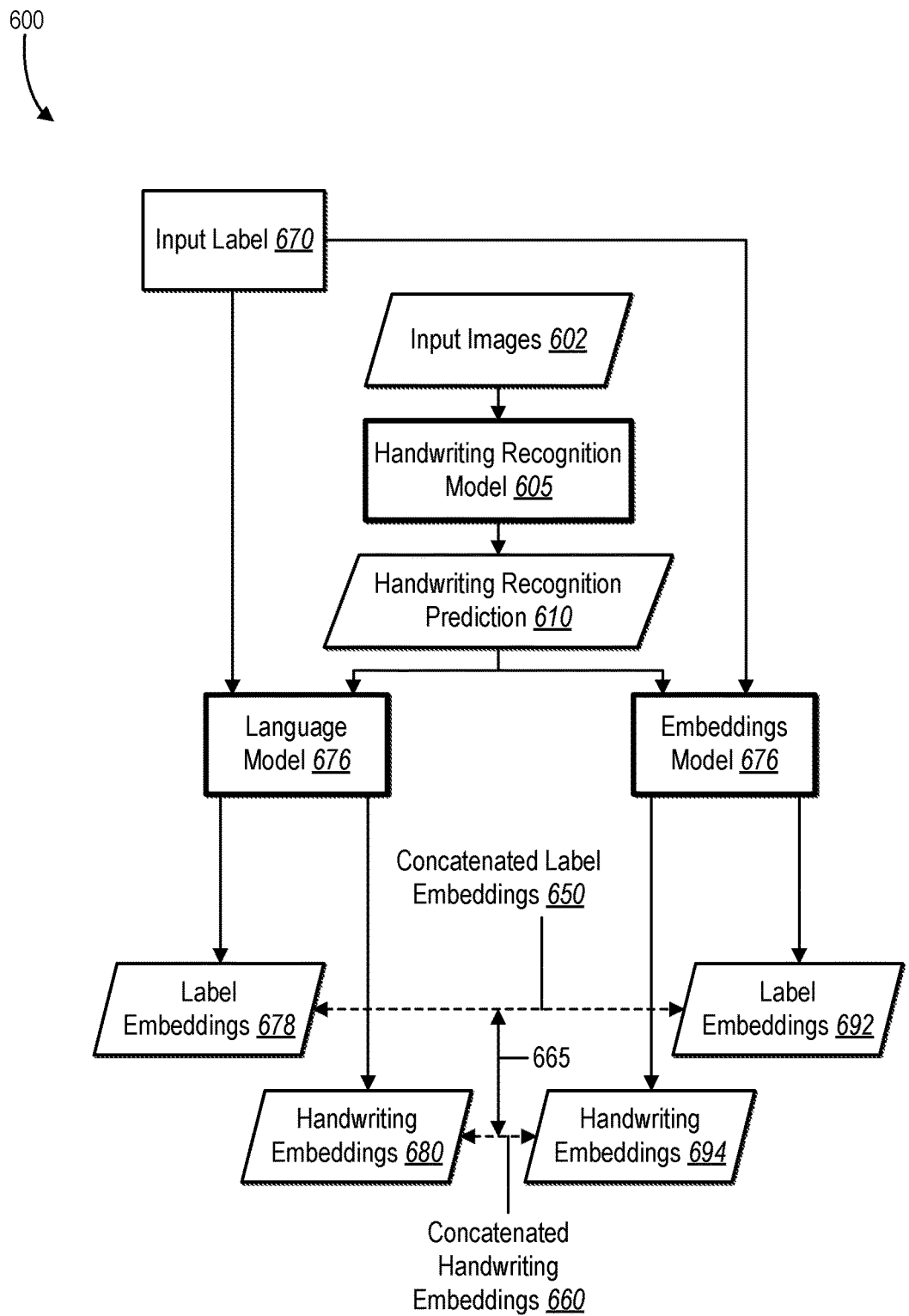
FIG. 6 is a diagram of using a trained handwriting recognition model and loss prediction module for inference of handwritten fields according to embodiments of the present disclosure.

Turning to FIG. 6, a diagram 600 of an embodiment of handwriting recognition using language modeling is shown and described. The diagram 600 includes receiving an input image 602 comprising handwriting and passing the input image 602 through a trained handwriting recognition model 605. The handwriting recognition model 605 may be trained according to the embodiment of, e.g., FIG. 2 or by any other suitable training method, and may be a CNNRNNCTC-based model or any other suitable model.

The handwriting recognition model 605 is configured to output a handwriting recognition prediction 610 which can be passed to a trained language model 676 to generate embeddings 680 of the handwriting prediction, as shown and described regarding FIGS. 2 and 3. In parallel, an input label 670, such as a manually generated label, may be passed through the trained language model 676 to generate one or more label embeddings 678 corresponding to one or more of the input images 602.

The input label 670 and/or the handwriting prediction 610 may be passed, in parallel, to a text to International Phonetic Alphabet ("IPA") embeddings model 690. The text to IPA embeddings model 690 may be configured to generate embeddings of the label 670 and/or the handwriting prediction 610. The text to IPA embeddings model 690 may generate embeddings based on lexical sounds in speech, e.g. phones, phonemes, intonation, the separation of words and syllables, tooth gnashing, lisping, and other sounds, and using letters and/or diacritics, thereby transforming text into a phonetic representation. For example, "Province Daniel E," from a manual label, can be represented by the text to IPA embeddings model as "dænjəl i:." Likewise, "John Smith" can become "dʒɑnsmɪθ." This advantageously captures the voice intensity, vowels, and consonants' manner and place of articulation, whether a syllable is formed, etc.

In particular, the text to IPA embeddings model 690 may advantageously provide additional information on top of name spellings for assessing a loss prediction and improving handwriting recognition results, e.g. by providing phonetic matching in addition to the language-model matching. To address the limitation of IPA dictionaries not having all names or other field values of interest, a suitable grapheme-to-phonemes ("G2P", where grapheme is the string characters themselves and phoneme is a unit of sound in a particular language) modality, such as Epitran—a tool for transliterating orthographic text as IPA—can be used. ARPAbet, in particular, a set of phonetic transcription codes for representing phonemes and allophones of general American English with distinct sequences of ASCII characters, may be used in embodiments.

Then phonemes obtained from the grapheme-to-phonemes modality can be embedded using a suitable phonemes-to-embeddings modality such as PatPho, in particular embodiments embedding CELEX phonemes. In embodiments, this is used to generate embeddings of the same length, e.g. 114, for words of any length. PanPhon, a database for relating IPA segments to definitions in articulatory features, may likewise or alternatively be used.

The label embeddings 678 from the language model 676 may be concatenated with the label embeddings 692 from the text to IPA embeddings model 690, while the handwriting embeddings 680 from the language model 676 may be concatenated with the handwriting embeddings 694 from the text to IPA embeddings model 690. The concatenated label embeddings 650 and the concatenated handwriting embeddings 660 can be compared to obtain a loss prediction for the handwriting model 605, the language model 676, and/or the text to IPA embeddings model 690.

It is to be understood that not necessarily all objects or advantages may be achieved under any embodiment of the disclosure. Those skilled in the art will recognize that the system, computer program product, and/or method for handwriting recognition using language modeling embodiments may be embodied or carried out, so they achieve or optimize one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize a system, computer program product, and/or method for handwriting recognition using language modeling under principles of the present disclosure. It will be understood by the skilled artisan that the features described may apply to other types of data, contexts, and/or models.

Although this disclosure describes certain exemplary embodiments and examples of a system, computer program product, and/or method for handwriting recognition using language modeling, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts of handwriting recognition, optical character recognition, types of documents, types of inputs, and types of applications as suitable.

The invention claimed is:

1. A hardware storage device having stored thereon computer-executable instructions that, when executed by one or more processors, cause a computing system to perform at least the following:
   receive an image comprising handwriting;
   generate, using a handwriting recognition model, a handwriting recognition prediction based on the image;
   generate, using a loss prediction module, a loss prediction for the handwriting recognition prediction;
   determine that the loss prediction does not exceed a predetermined threshold; and
   generate, using a language model, an embedding of the handwriting recognition prediction.

2. The hardware storage device of claim 1, further configured to perform at least the following:
   generate, based on the embedding of the handwriting recognition prediction, an embedding-based prediction of a name depicted in the image.

3. The hardware storage device of claim 1, further configured to perform at least the following:
   search an embedding dictionary using the embedding of the handwriting recognition prediction to identify from the embedding dictionary a value related to the embedding.

4. The hardware storage device of claim 1, wherein the language model is a character-based language model.

5. The hardware storage device of claim 1, wherein the handwriting recognition model and the loss prediction module are trained together by performing at least the following:
   during a training phase, receive an image comprising handwriting and a manual label corresponding to the image;
   generate, using a handwriting recognition model, a handwriting recognition prediction based on the image;
   determine a loss between the manual label and the handwriting recognition prediction and adjusting one or more components of the handwriting recognition model using the loss;
   generate, using a loss prediction module, a loss prediction for the handwriting recognition prediction;
   generate, using a language model, an embedding of the handwriting recognition prediction and of the corresponding manual label;
   determine an embedding loss between the embeddings;
   determine a loss-prediction loss between the embedding loss and the loss prediction; and
   adjust one or more components of the loss prediction module using the loss-prediction loss.

6. The hardware storage device of claim 2, wherein the language model is trained by performing at least the following:
   receive a dataset;
   transform the dataset with one or more changes; and
   train the language model using a comparison between embeddings of corresponding fields in the dataset and the transformed dataset.

7. The hardware storage device of claim 6, wherein the language model is chars2vec and the dataset is a names dataset.

8. The hardware storage device of claim 1, wherein the loss prediction module is configured to receive a feature from a mid-level component of the handwriting recognition model.

9. The hardware storage device of claim 1, wherein the loss prediction module is jointly learned with the handwriting recognition model.

10. A computer-implemented method for handwriting recognition comprising:
    receiving an image comprising handwriting;
    generating, using a handwriting recognition model, a handwriting recognition prediction based on the image;
    generating, using a loss prediction module, a loss prediction for the handwriting recognition prediction;
    determining that the loss prediction does not exceed a predetermined threshold;
    generating, using a language model, an embedding based on the handwriting recognition prediction; and
    searching an embedding dictionary using the embedding as a query to identify a related value.

11. The computer-implemented method for handwriting recognition of claim 10, wherein the handwriting recognition model is a CNNRNNCTC-based model comprising a convolutional neural network (CNN) component, a recurrent neural network (RNN) component, and a connectionist temporal classification (CTC) component.

12. The computer-implemented method for handwriting recognition of claim 11, wherein the loss prediction module receives a feature from one or more of the CNN component, the RNN component, and the CTC component.

13. The computer-implemented method for handwriting recognition of claim 11, wherein the language model is a character-based language model trained based on a transformed dataset corresponding to the image comprising handwriting.

14. The computer-implemented method for handwriting recognition of claim 10, wherein the related value is identified using an approximate nearest neighbor search.

15. The computer-implemented method for handwriting recognition of claim 13, wherein the embedding dictionary is generated by passing a dataset corresponding to the image comprising handwriting through the trained language model.

16. A system comprising:
    one or more processors; and
    one or more hardware storage devices having stored thereon computer-executable instructions that, when executed by the one or more processors, configure the system to perform at least the following:
    receive an image comprising handwriting;
    generate, using a handwriting recognition model, a handwriting recognition prediction based on the image;

generate, using a loss prediction module, a loss prediction for the handwriting recognition prediction based on a feature from the handwriting recognition model;

determine that the loss prediction does not exceed a predetermined threshold;

generate, using a language model, an embedding based on the handwriting recognition prediction; and search an embedding dictionary using the embedding as a query to identify a related value.

17. The system of claim 16, wherein the handwriting recognition model is a CNNRNNCTC-based model comprising a CNN component, an RNN component, and a CTC component and the language model is a character-based language model trained based on a transformed dataset corresponding to the image comprising handwriting.

18. The system of claim 17, wherein the loss prediction module receives the feature from one or more of the CNN, RNN, and CTC components of the handwriting recognition model.

19. The system of claim 16, wherein the handwriting recognition model and the loss prediction module are jointly trained using (i) a comparison between the handwriting recognition prediction and a manual label corresponding to the handwriting recognition prediction and/or (ii) a comparison between the loss prediction and an embedding loss.

20. The system of claim 19, wherein the embedding loss is determined by generating, using the language model, a handwriting recognition prediction embedding and a manual label embedding, and comparing the embeddings.

* * * * *